US007799105B2

(12) United States Patent
Nuppenau et al.

(10) Patent No.: US 7,799,105 B2
(45) Date of Patent: Sep. 21, 2010

(54) APPARATUS FOR THE ELIMINATION OF DUSTS FROM GASES

(75) Inventors: Detlef Nuppenau, Salem (DE); Gabriele Oelerich, Geesthacht (DE); Dieter Schmidt, Hamburg (DE); Eugen Krüger, Schwarzenbek (DE); Regine Wrage, Schwarzenbek (DE); Harald Römer, Reinbek (DE)

(73) Assignee: Fette GmbH, Schwarzenbek (DE)

( * ) Notice: Subject to any disclaimer, the term of this patent is extended or adjusted under 35 U.S.C. 154(b) by 248 days.

(21) Appl. No.: 12/054,978

(22) Filed: Mar. 25, 2008

(65) Prior Publication Data

US 2008/0256910 A1 Oct. 23, 2008

(30) Foreign Application Priority Data

Mar. 27, 2007 (DE) ....................... 10 2007 015 176

(51) Int. Cl.
*B01D 50/00* (2006.01)

(52) U.S. Cl. ............................ 55/337; 55/349; 55/428; 55/459.1; 55/DIG. 3; 15/352; 15/353

(58) Field of Classification Search ................... 55/337, 55/349, 428, 459.1, DIG. 3; 15/352, 353
See application file for complete search history.

(56) References Cited

U.S. PATENT DOCUMENTS 3,425,192 A * 2/1969 Davis .......................... 55/345
3,870,486 A * 3/1975 Eriksson et al. ............... 96/385
3,877,902 A * 4/1975 Eriksson et al. ............... 55/337
4,261,710 A * 4/1981 Sullivan ...................... 95/282
4,578,840 A * 4/1986 Pausch ........................ 15/352
5,080,697 A 1/1992 Finke
5,961,675 A 10/1999 Son et al.
6,679,930 B1 * 1/2004 An et al. ........................ 55/337
7,371,269 B2 * 5/2008 Kawasaki .................. 55/459.1
7,479,171 B2 * 1/2009 Cho et al. ...................... 55/338
2002/0194993 A1 * 12/2002 Gen ............................ 95/268
2003/0084537 A1 * 5/2003 Conrad et al. ................. 15/353
2003/0167740 A1 * 9/2003 Murphy ........................ 55/337
2004/0040270 A1 * 3/2004 Inoue et al. .................... 55/345
2004/0088956 A1 * 5/2004 Gammack .................... 55/346
2005/0223519 A1 10/2005 Greene
2005/0223520 A1 10/2005 Greene
2007/0028569 A1 * 2/2007 Murphy ........................ 55/337
2008/0047239 A1 * 2/2008 Zheng et al. .................. 55/337
2008/0172992 A1 * 7/2008 Conrad ........................ 55/323

(Continued)

FOREIGN PATENT DOCUMENTS

DE 41 11 031 C2 12/1999

(Continued)

*Primary Examiner*—Jason M Greene
*Assistant Examiner*—Dung Bui
(74) *Attorney, Agent, or Firm*—Vidas, Arrett & Steinkraus, P.A.

(57) ABSTRACT

An apparatus for the elimination of dusts from gases, with a filter arrangement, which is flown through by a loaded volume flow, and a cyclone which is arranged upstream to the filter arrangement, wherein a collector funnel below the filter arrangement forms the cover of the cyclone, wherein a branch stub forming the dust outlet opening of the collector funnel forms the dip pipe of the cyclone and an outlet opening of the cyclone is connected to a dust collector tank arranged under it.

2 Claims, 1 Drawing Sheet

U.S. PATENT DOCUMENTS

2009/0031680 A1 * 2/2009 Hyun et al. .................. 55/345

FOREIGN PATENT DOCUMENTS

EP 0 564 992 A2 2/1993
EP 0 564 992 A2 4/1993
GB 2 340 056 A1 6/1998
GB 2 340 056 A 10/1998

* cited by examiner

APPARATUS FOR THE ELIMINATION OF DUSTS FROM GASES

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It is known to use filter arrangements for the elimination of dusts from gases. A ventilator provides the necessary volume flow. The separation of the dusts takes place by various filter media, by filter cassettes for instance. In order to prevent a rapid growth of the filter cake and of the resistance to fluid flow accompanied by the latter, pre-fractionators are also used. The same are intended to minimise the dust load of the filter media.

It is known to use baffles, baffle-plate separators or cyclones as pre-fractionators. From DE 41 11 031 A1, the entire contents of which is incorporated hereby in reference, it is known to arrange a cyclone upstream to a filter arrangement. The raw gas is supplied to the cyclone tangentially through the inlet channel into the upper cylindrical portion. A rotational flow is generated, which continues towards the downside into a conical part. By the centrifugal force, the particles are thrown towards the outside, where they slide downwards along the cone wall. In the dip pipe, the gas flow of the cyclone is directed upwards across the cone.

The present invention is based on the objective to provide an apparatus for the elimination of dusts from gases by which the space demand of the filter arrangement is minimised.

BRIEF SUMMARY OF THE INVENTION

In the apparatus of the present invention, a collector funnel below the filter arrangement is provided as the cover of a cyclone. The dust outlet opening of the collector funnel is formed by a branch stub, which is the dip pipe of the cyclone at the same time. At the lower end of the cyclone there is the outlet opening for the dust, which is guided into a collector tank.

By the fact that the cover of the cyclone forms the dust outlet funnel of the working filter at the same time and the dip pipe of the cyclone forms the dust outlet opening of the working filter also at the same time, the construction height of the apparatus of the present invention is minimum.

According to one embodiment of the present invention, the bottom of the cyclone is also designed as a funnel and is provided with a central dust outlet opening.

In a further embodiment of the present invention, it is provided that the filter arrangement has a working filter with a circular casing which is set up immediately onto the cyclone. The casing which accommodates all the components is preferably rectangular in its cross section, and the raw gas supplied from the upside reaches the cyclone tangentially via a pipe arranged in the casing.

BRIEF DESCRIPTION OF THE SEVERAL VIEWS OF THE DRAWINGS

An example of the realisation of the present invention is explained in more detail by means of drawings below.

DETAILED DESCRIPTION OF THE INVENTION

Figure 1:
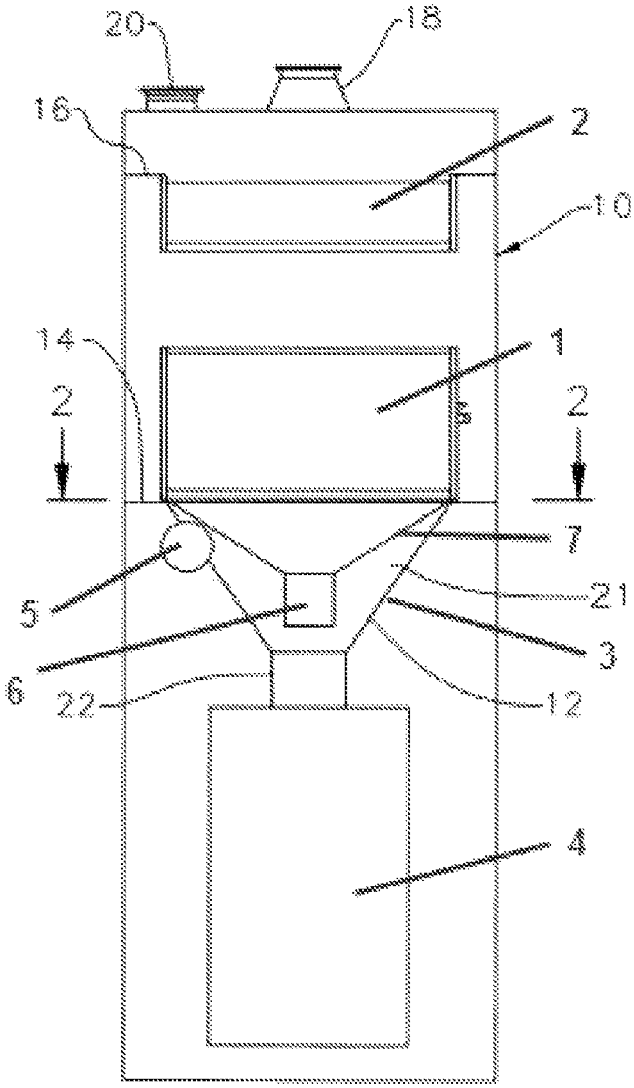
FIG. 1 shows a cross section through an apparatus of the present invention.

While this invention may be embodied in many different forms, there are described in detail herein a specific preferred embodiment of the invention. This description is an exemplification of the principles of the invention and is not intended to limit the invention to the particular embodiment illustrated In the figures, a casing 10 rectangular in its cross section is shown, which features a series of dust separating components one upon the other. A dust collector tank 4 is arranged on the bottom of the casing 10. Above the dust collector tank 4 is arranged a cyclone 3. The cyclone 3 has a funnel-shaped cover 7 and a funnel-shaped bottom 12. They form a ring conical space 21. In the centre of the funnel-shaped cover 7, a branch stub is connected, which forms a dip pipe 6 for the cyclone 3. Onto the cyclone 3, a working filter 1 is set up, which is accommodated in a circular casing. In a distance to the working filter 1, a security filter 2 is arranged on the upside. Working filter 1 and security filter 2 are closed off against the remaining inner space of the casing 10 by circular wall sections 14 and 16, respectively.

Figure 2:
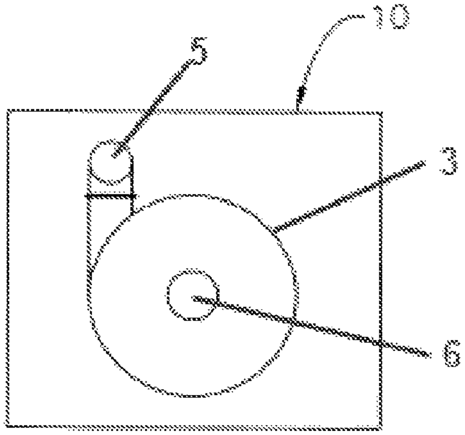
FIG. 2 shows a cross section through the representation of FIG. 1, along the line 2-2.

In the centre of the cover of the tank 10, an outlet stud 18 for purified gas is arranged. Alongside to it is arranged a further stud 20, which is in communication with a line 5 (FIG. 2) for raw gas. The line 5 runs out tangentially into the funnel-shaped bottom section 12 of the cyclone 3.

The raw gas enters into the cyclone 3 tangentially, and separated dusts slip to a pipe-shaped outlet 22 into the dust collector tank 4 via the funnel-shaped bottom wall 12. Pre-purified gas reaches the working filter 1 and the security filter 2 via the dip pipe 6 and escapes via the stud 18 as a purified gas.

When the working filter 1 is to be cleaned, the supply for the raw gas is cut off, and by suitable cleaning means, the dust is conveyed out of the working filter into the dust collector funnel, which forms the cover 7 for the cyclone 3 at the same time. Thus, the dusts reach the dust collector tank 4.

When the dust collector tank 4 is full, it is replaced by an empty one. In this period, the pipe stud 22 is closed. The closing means is not shown here.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An apparatus for the elimination of dusts from gases, comprising a cyclone (3) having a funnel shaped bottom portion (12), a tangential inlet (5) for a loaded volume flow of gas, and a lower opening (22) in the bottom portion (12), a collector tank (4) being located below the opening (22), further comprising a funnel shaped cover (7) for the cyclone having a loader dip pipe (6) extending into the cyclone above opening (22) thereof, a working filter (1) in a circular casing above cover (7) of cyclone (3), a circular security filter (2) above the working filter (1), collector tank (4), cyclone (3), cover (7), working filter (1) and security filter (2) being included in a common casing (10) which has an upper outlet stud (18) for purified gas and a stud for loaded gas, a space being formed between the outlet of the working filter and the inlet of the security filter so that gas from the cyclone and entering the working filter through the dip pipe may leave through the upper stud (18) after having passed the security filter.

2. An apparatus according to claim 1, characterized in that the bottom (12) of the cyclone (3) is also funnel shaped, with a central dust outlet opening (22).

* * * * *